United States Patent
Ramirez

(10) Patent No.: US 7,059,145 B2
(45) Date of Patent: Jun. 13, 2006

(54) SELF-SERVING POWER PRODUCING APPARATUS

(76) Inventor: Guadalupe Ramirez, 13881 Tustin East Dr., #151C, Tustin, CA (US) 92780

( * ) Notice: Subject to any disclaimer, the term of this patent is extended or adjusted under 35 U.S.C. 154(b) by 301 days.

(21) Appl. No.: 10/678,524

(22) Filed: Oct. 3, 2003

(65) Prior Publication Data

US 2004/0148952 A1  Aug. 5, 2004

Related U.S. Application Data

(60) Provisional application No. 60/444,034, filed on Jan. 31, 2003.

(51) Int. Cl.
*F25B 27/00* (2006.01)

(52) U.S. Cl. .................................. 62/236

(58) Field of Classification Search ............ 62/236, 62/237, 448, 188; 318/43
See application file for complete search history.

(56) References Cited

U.S. PATENT DOCUMENTS

| | | | | |
|---|---|---|---|---|
| 3,530,356 A | * | 9/1970 | Aronson | 320/117 |
| 4,095,665 A | * | 6/1978 | Armfield | 180/65.3 |
| 4,477,764 A | * | 10/1984 | Pollard | 320/116 |
| 5,406,126 A | * | 4/1995 | Hadley et al. | 290/45 |

* cited by examiner

*Primary Examiner*—Melvin Jones
(74) *Attorney, Agent, or Firm*—Blakely Sokoloff Taylor & Zafman, LLC

(57) ABSTRACT

According to one embodiment of the invention, a self-serving power producing apparatus capable of being recharged by a charging mechanism is described. The power producing apparatus comprises a rechargeable power source, a motor powered by the rechargeable power source, and a pulley including a first armature rotated by the motor and a second armature. In addition, the power producing apparatus comprises a power unit coupled to the second armature of the pulley. The power unit comprises an alternator to produce direct current (DC) power for recharging the rechargeable power source and a generator to produce a level of alternating current (AC) power.

16 Claims, 2 Drawing Sheets

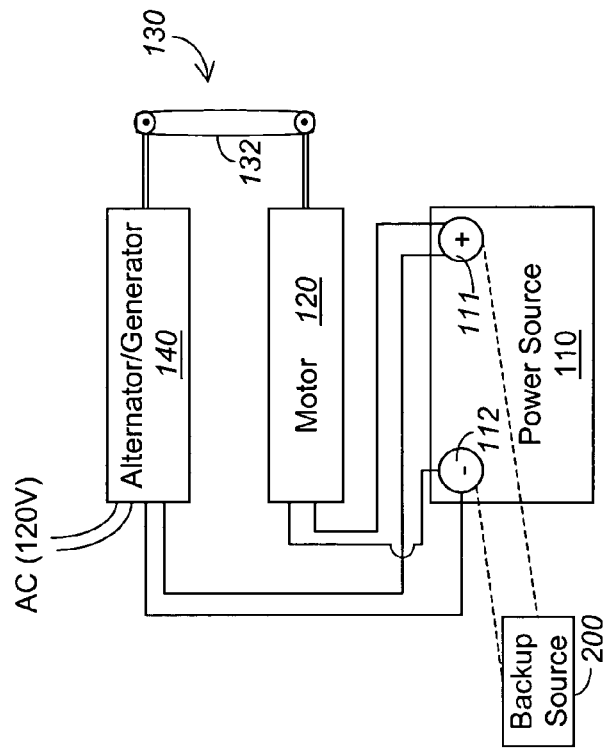
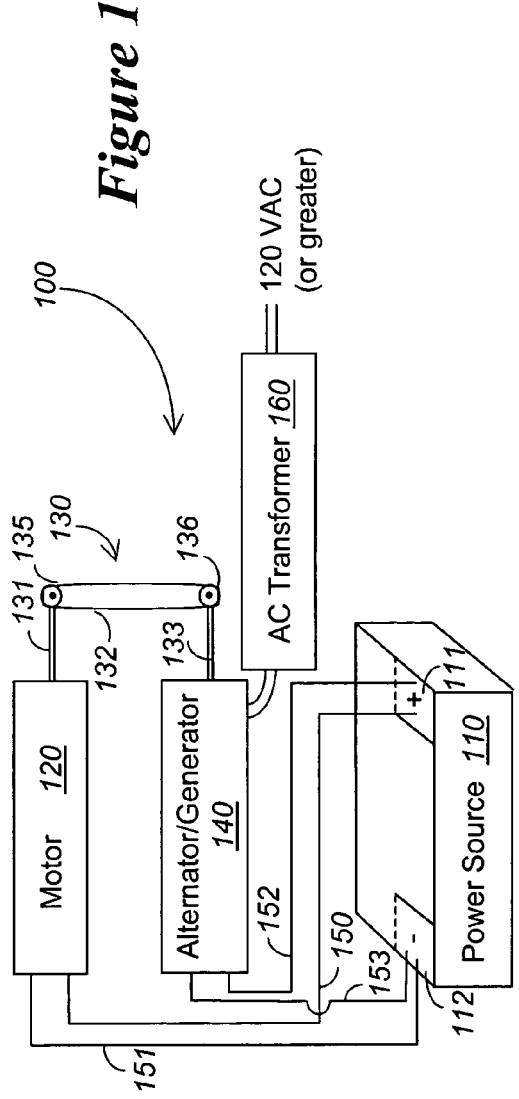
*Figure 1*
*Figure 2*

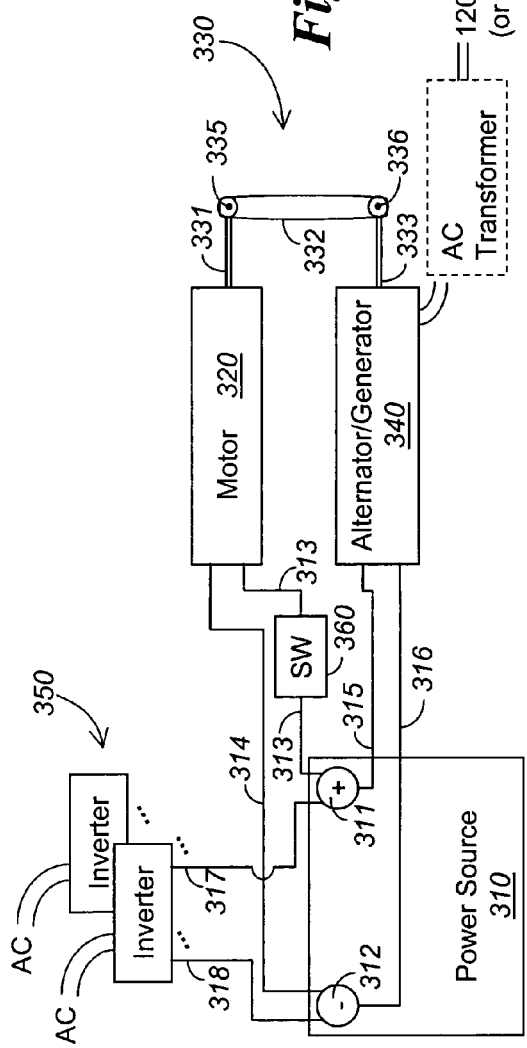
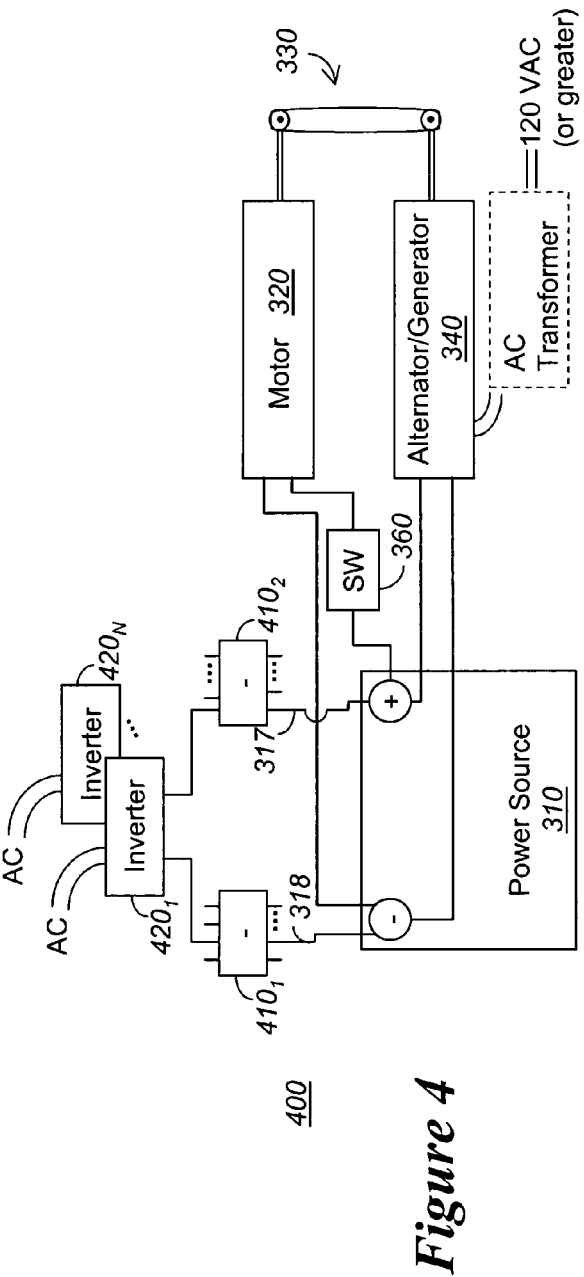

SELF-SERVING POWER PRODUCING APPARATUS

CROSS-REFERENCES TO RELATED APPLICATIONS

This application claims the benefit of priority on U.S. Provisional Application No. 60/444,034, filed Jan. 31, 2003.

FIELD OF THE INVENTION

Embodiments of the invention relate to the field of power generators and power supplies and improved operations associated therewith.

BRIEF DESCRIPTION OF THE DRAWINGS

The features and advantages of the invention will become apparent from the following detailed description of embodiments of the invention in which:

FIG. 1 is a first exemplary embodiment of a self-serving power producing apparatus.

FIG. 2 is a second exemplary embodiment of a self-serving power producing apparatus.

FIG. 3 is a third exemplary embodiment of a self-serving power producing apparatus.

FIG. 4 is a fourth exemplary embodiment of a self-serving power producing apparatus.

DETAILED DESCRIPTION

Herein, embodiments of the invention relate to a power producing apparatus that is capable of being recharged by a charging mechanism so that the power producing apparatus is self-serving. In general, the self-serving power producing apparatus comprises a (i) motor, (ii) an alternator/generator with AC-to-DC conversion capability, (iii) a pulley coupled to the motor and the alternator/generator, and (iv) a rechargeable power source.

For one embodiment, a direct current power source with a predetermined voltage level (e.g., twelve volt "VDC" battery) runs a direct current (DC) motor with a predetermined horsepower (e.g., ≧1 hp). The DC motor rotates an armature of the pulley that rotates a belt, chain or another type of medium in a clockwise or counterclockwise direction. This medium rotates an armature that is associated with a power unit being inclusive of an alternator/generator positioned in close proximity to at least two positively charged windings within a casing of the alternator/generator.

The rotation of the armature coupled to the alternator/generator creates at least two magnetic fields, one of which produces a first predetermined amount of AC power, which is transformed to DC power by an AC-to-DC converter. The DC power is supplied to the power source for recharging purposes. The other magnetic field produces a second predetermined amount of AC power, which is supplied to one or more transformers to step-up the AC power to larger voltage(s). Since the size of the windings and number of coils influence the level of AC power created by the magnetic fields, it is contemplated that these factors may be altered to achieve desired AC power levels.

The pulley used by the alternator/generator and the DC motor is matched to turn the alternator/generator at a given revolutions per minute (RPM) and to produce a selected amount of power.

The embodiments described herein are not exclusive; rather, they merely provide a thorough understanding of the invention. Also, well-known elements are not set forth in detail in order to avoid unnecessarily obscuring the invention.

In the following description, certain terminology is used to describe features of the invention. For example, a "power source" is any product that produces direct current (DC) power and is capable of being recharged. Examples of a power source include, but are not limited or restricted to a battery. A "power line" is a power transferring medium that enables DC power to be provided to a targeted component. Examples of a power line include, but are not limited or restricted to a cable or an electrical wire. A "pulley" is any mechanism that causes a belt, chain or another type of medium to rotate in a clockwise or counterclockwise motion, which causes an armature coupled to the pulley to rotate.

Referring to FIG. 1, a first exemplary embodiment of a self-serving power producing apparatus 100 is shown. The generator 100 comprises a power source 110, a motor 120, a pulley 130 and an alternator/generator 140 that comprises an alternator and a generator. Therein, the alternator features an AC-to-DC converter to produce DC power, while the generator, perhaps in combination with one or more transformers, produces a desired amount of AC power. The DC power is used for recharging the power source 110 while the AC power is used for supplying power to one or more external devices.

In one embodiment, the power source 110 is a rechargeable battery having a positive post 111 and a negative post 112. By attaching power lines 150 and 151 to these posts 111 and 112, the rechargeable battery 110 is adapted to supply power to the motor 120.

The motor 120 is a DC motor that rotates a first armature 131 in a clockwise or counter-clockwise direction. The first armature 131 then rotates a pulley wheel 135 in the same direction. A rotational medium 132 is removably coupled to the pulley wheel 135 of the pulley 130, which is also rotated in a clockwise or counterclockwise direction. As previously described, the rotational medium 132 may be a hardened plastic belt or even a chain.

The rotation of medium 132 causes a pulley wheel 136, which is attached to a second armature 133, to rotate in a clockwise or counterclockwise direction consistent with the rotational direction of the pulley wheel 135. This causes the second armature 133 to rotate, which causes the alternator/generator 140 to produce AC power, the level of which may be increased by a transformer 160 situated within the casing of the alternator/generator 140 or external thereto. For instance, the resultant AC power may be increased from 7–12 VAC into approximately 120 VAC, 240 VAC or another VAC range.

In addition, additional AC power is produced by the alternator/generator 140, which is input into an AC-to-DC converter (not shown). The converter produces DC power that is supplied to the rechargeable battery 110 via power lines 152 and 153.

As shown in FIG. 1, the motor 120 and alternator/generator 140 may be positioned vertically or horizontally with respect to each other, provided the armatures 131 and 133 are substantially horizontally oriented to the ground.

It is contemplated that the powering of the motor 120 may be conducted in a throttled (periodic) manner in the event that the power source 110 cannot be charged and discharged simultaneously. As a result, the power source 110 will be discharged and recharged during selected periods of time.

It is further contemplated that the pulley 130 may be accomplished through a single pulley component as shown, or perhaps, multiple pulleys operating in combination to rotate the second armature 133.

Referring now to FIG. 2, a second exemplary embodiment of a self-serving power producing apparatus 200 is shown. The embodiment of the invention operates in a manner similar to the generator 100 of FIG. 1, except that a backup power source 200 is further coupled to the positive and negative posts 111 and 112 of the power source 110. This not only provides supplemental power for recharging purposes, but also provides a redundant recharging mechanism in the event that any one or more of the motor 120, pulley 130, or alternator/generator 140 is not functioning properly. The backup power source 200 may be an alternative energy solution component such as one or more solar panels, windmill, etc.

Referring to FIG. 3, a third exemplary embodiment of a self-serving power producing apparatus 300 is shown. The generator 300 comprises a rechargeable power source 310, a comprises a rechargeable power source 310, a motor 320, a pulley 330, an alternator/generator 340, one or more power inverters 350 and a switch 360. The alternator and AC-to-DC converter components of the alternator/generator 340 produce DC power for recharging the power source 310, while the generator component (and optionally the transformer) produces AC power supplied to devices external to the self-serving power producing apparatus 300.

In one embodiment of the invention, the power source 310 is a rechargeable battery having a positive post 311 and a negative post 312. By attaching power lines 313 and 314 to these posts 311 and 312, the rechargeable battery 310 is adapted to supply power to the motor 320. A switch 360 is interposed between two ends of the power line 313 to provide a mechanism to discontinue power to the motor 320.

The motor 320 is a DC motor that rotates one of the armatures 331 in a clockwise or counterclockwise direction, which rotates a pulley wheel 335 coupled to the armature 331. A rotational medium 332 (e.g., belt, chain, etc.) is removably coupled to the pulley wheel 335 of the pulley 330 and is rotated in a clockwise or counterclockwise direction consistent with the direction of rotation by the armature 331.

In response to the rotation of medium 332, another pulley wheel 336, attached to armature 333, is rotated in a clockwise or counterclockwise direction identical to the rotational direction of the armature 331. This causes the armature 333 to rotate, which in general causes alternator/generator 340 to produce AC power and DC power. The DC power is supplied to the rechargeable power source 310 (e.g., battery) via power lines 315 and 316.

Coupled to the power source 310 via power lines 317 and 318, power inverter(s) 350 are used to convert DC power from the power source 310 into AC power supplied to external devices in lieu of or in addition to the generator component of the alternator/generator 340. As a result, it is contemplated that the generator component may be eliminated from the alternator/generator 340 of FIG. 3.

As previously mentioned, it is contemplated that the powering of the motor 320 may be conducted in a throttled (periodic) manner in the event that the power source 310 cannot be charged and discharged simultaneously. As a result the power source 310 will be discharged and recharged during selected periods of time.

Referring to FIG. 4, a fourth exemplary embodiment of a self-serving power producing apparatus 400 is shown. The generator 400 comprises rechargeable power source 310, a motor 320, a pulley 330, an alternator/generator 340, a switch 360, and at least two junction boxes 4101 and 4102 positioned for coupling power source 310 to one or more power (DC-to-AC) inverters 4201–420N (N>1). This enables power inverter(s) $420_1$–$420_N$ to be added or removed without readjustment of power lines 317 and 318.

While certain exemplary embodiments have been described and shown in the accompanying drawings, it is to be understood that such embodiments are merely illustrative of the invention in order to provide a thorough understanding of the invention. Also, well-known circuits are not set forth in detail in order to avoid unnecessarily obscuring the invention.

What is claimed is:

1. A power producing apparatus comprising:
   a rechargeable power source;
   at least one power inverter coupled to the rechargeable power source via a plurality of power lines;
   a motor powered by the rechargeable power source;
   a pulley including a first armature rotated by the motor; and
   a power unit coupled to a second armature of the pulley, the power unit comprises an alternator to produce direct current (DC) power for recharging the rechargeable power source and a generator to produce a level of alternating current (AC) power.

2. The power producing apparatus of claim 1, wherein the rechargeable power source is a twelve volt direct current rechargeable battery.

3. The power producing apparatus of claim 1, wherein power unit is electrically coupled to a positive terminal of the rechargeable power source via a first power line and is electrically coupled to a negative terminal of the rechargeable power source via a second power line.

4. The power producing apparatus of claim 3, wherein motor is electrically coupled to a positive terminal of the rechargeable power source via a third power line and is electrically coupled to a negative terminal of the rechargeable power source via a fourth power line.

5. The power producing apparatus of claim 4 further comprising a transformer coupled to the generator of the power unit, the transformer to provide at least 120 volts alternating current (VAC) from the level of AC power being less than 10 VAC.

6. The power producing apparatus of claim 4 further comprising a backup power source coupled to the positive terminal and the negative terminal of the rechargeable power source.

7. The power producing apparatus of claim 3 further comprising a switch coupled between a third power line interconnecting the positive terminal of the rechargeable power source to the motor and is electrically coupled to a negative terminal of the rechargeable power source via a fourth power line.

8. The power producing apparatus of claim 1 further comprising at least one power inverter coupled to the rechargeable power source via a plurality of power lines.

9. A power producing apparatus comprising:
   means for supplying power including a rechargeable battery;
   a motor electrically coupled to the means for supplying power
   means for producing direct current (DC) power for recharging the means for supplying power and for producing alternating current (AC) power, the means for recharging being electrically coupled to a positive terminal of the rechargeable battery via a first power line and is electrically coupled to a negative terminal of the rechargeable battery via a second power line;

a backup power source coupled to the positive terminal and the negative terminal of the rechargeable battery; and a pulley that comprises a first armature coupled to the motor and a second armature coupled to the means for producing, the first armature of the pulley being rotated by the motor and the second armature being rotated in response to rotation of the first armature to cause the means for producing to produce the DC power and the AC power.

10. The power producing apparatus of claim 9, wherein motor is electrically coupled to a positive terminal of the rechargeable battery via a third power line and is electrically coupled to a negative terminal or the rechargeable battery via a fourth power line.

11. The power producing apparatus of claim 9 further comprising a transformer coupled to the means for producing the AC power, the transformer to provide at least 120 volts alternating current (VAC) from the level of AC power being less than 10 VAC.

12. A power producing apparatus comprising:
a rechargeable power source;
a motor powered by the rechargeable power source;
a pulley including a first an-nature rotated by the motor;
a power unit coupled to a second armature of the pulley, the power unit comprises an alternator to produce direct current (DC) power for recharging the rechargeable power source and a generator to produce a level of alternating current (AC) power;
a power inverter coupled to the rechargeable power source, the power inverter to produce AC power for use by external devices.

13. The power producing apparatus of claim 12, wherein the rechargeable power source is a twelve volt direct current rechargeable battery.

14. The power producing apparatus of claim 12 further comprising at least one junction box directly connected to both the rechargeable power source and the power inverter.

15. The power producing apparatus of claim 14 further comprising:
a first power line coupled to a positive terminal of the rechargeable power source and a first junction box of the at least one junction box; and
a second power line coupled to the first junction box of the at least one junction box and the power inverter.

16. The power producing apparatus or claim 14 further comprising;
a third power line coupled to a negative terminal of the rechargeable power source and a second junction box of the at least one junction box; and
a fourth power line coupled to the second junction box of the at least one junction box and the power inverter.

* * * * *